United States Patent

Firester

[15] 3,646,358
[45] Feb. 29, 1972

[54] OPTICAL UPCONVERTER

[72] Inventor: Arthur H. Firester, Kendall Park, N.J.
[73] Assignee: The United States of America as represented by the Secretary of the Army
[22] Filed: May 15, 1970
[21] Appl. No.: 37,647

[52] U.S. Cl. .................................307/88.3, 250/83.3 HP
[51] Int. Cl. ..............................................H03f 7/04
[58] Field of Search..................307/88.3; 330/4.5; 250/83.3 HP

[56] References Cited

UNITED STATES PATENTS

| | | | |
|---|---|---|---|
| 3,450,997 | 6/1969 | Patel | 307/88.3 |
| 3,487,230 | 12/1969 | Costich | 307/88.3 |
| 3,300,653 | 1/1967 | Boyd et al | 307/88.3 |
| 3,384,433 | 5/1968 | Bloembergen | 307/88.3 |
| 3,551,844 | 12/1970 | Smith | 307/88.3 |

*Primary Examiner*—Roy Lake
*Assistant Examiner*—Darwin R. Hostetter
*Attorney*—Harry M. Saragovitz, Edward J. Kelly, Herbert Berl and Jeremiah G. Murray

[57] ABSTRACT

An optical upconverter having a pump beam, a signal beam, and an optically nonlinear material for mixing the pump and signal beams to obtain an output beam having a frequency which is the sum of the pump and signal beams. The pump beam is generated by a laser and the nonlinear material is mounted in the laser cavity. The laser beam is a linearly polarized plane wave. The signal beam is directed into the cavity through a polarizer which linearly polarizes the signal beam in a direction which is orthogonal to the pump beam. The nonlinear material is cut and oriented in the cavity such that nonlinear mixing of the pump beam will occur only with the signal beam and not with itself. Therefore, depletion of the pump beam will occur only during mixing with the signal beam, and second harmonic generation of the pump beam will not occur.

6 Claims, 2 Drawing Figures

INVENTOR.
ARTHUR H. FIRESTER

OPTICAL UPCONVERTER

The present invention relates to image converters and the like and more particularly to optical upconverters using nonlinear optical materials.

In the fields of thermography, night surveillance, night communications, etc., it has been the general practice to employ devices such as image converters for the purpose of converting infrared images into visible images. The optical upconverter shifts the frequency of a relatively weak signal beam into the visible light region, by mixing the weak signal beam, and a relatively strong pump beam in a nonlinear optical material to obtain a visual output at the sum frequency.

Nonlinear optical upconverters have not proved entirely satisfactory for the reason that depletion of the pump beam by nonlinear interactions of the pump beam with itself have attributed to severe inefficiencies.

The general purpose of this invention is to provide a nonlinear optical upconverter wherein depletion of the pump beam occurs only by the mutual interaction of the pump and signal beams. To attain this, the present invention contemplates a unique optical system having a nonlinear material oriented such that the nonlinear interaction of the two beams occurs only when each of them has a well defined and mutually orthogonal polarization.

It is, therefore, the primary object of the present invention to provide a highly efficient optical upconverter.

Another object is to provide an optical upconverter having an output and only if both the pump and signal beams are present.

Other objects and many of the attendant advantages of this invention will be readily appreciated as the same becomes better understood by reference to the following detailed description when considered in connection with the accompanying drawing, in which.

Figure 1:
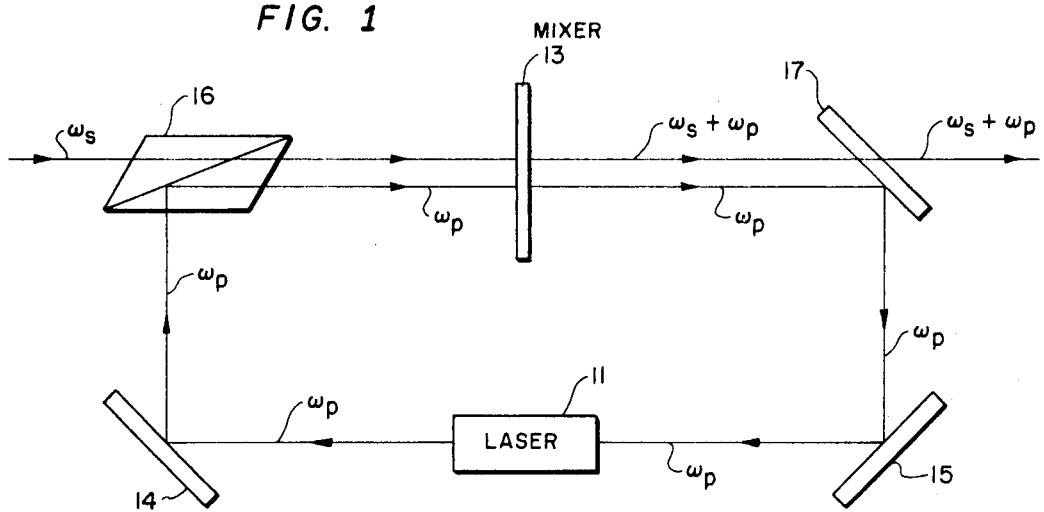
FIG. 1 is a diagrammatic view of a preferred embodiment of the invention.

Referring now to the drawing there is shown in FIG. 1 an optical upconverter having a laser 11 for providing a pump beam $\omega_p$, a signal beam $\omega_s$, and a nonlinear optical material 13. Laser 11 and nonlinear material 13 are mounted in a resonant cavity formed by mirrors 14 and 15, polarizer 16, and dichroic mirror 17. Laser 11 is represented simply by a box and the specific elements such as the laser pump, the coolants, etc., are not shown for purposes of simplicity.

The nonlinear material 13 must be transparent at the laser frequency $\omega_p$. The laser beam $\omega_p$ is a linearly polarized plane wave. The polarizer 16 therefore reflects all of the beam $\omega_p$ toward the nonlinear material 13. The signal beam $\omega_s$ enters the resonant cavity through the polarizer 16 which linearly polarizes the signal beam $\omega_s$ in a direction which is orthogonal to the laser beam $\omega_p$, i.e., one beam being the ordinary ray and the other being the extraordinary ray.

The nonlinear material 13 is chosen such that an upconverted signal $\omega_s+\omega_p$ will be produced in the crystal due to nonlinear interactions between the signal and pump beams $\omega_s$ and $\omega_p$. Therefore, as a result of the upconversion an infrared image having a center frequency $\omega_s$ may be converted into a visible image having a center frequency $\omega_s+\omega_p$.

Generally the principles upon which the nonlinear material 13 mixes two beams is well known and is described in the literature. One basic requirement is that the nonlinear material 13 be index matched for the frequencies $\omega_s$ and $\omega_p$. Index matching is the process by which the electric fields of all three waves $\omega_s$, $\omega_p$, and $\omega_s+\omega_p$ are made to travel in material 13 at the proper velocities so that the mixing can occur in phase over the thickness of the material 13. The velocities of the waves $\omega_p$, $\omega_s$, and $\omega_s+\omega_p$ must satisfy the wavevector equation $$\bar{K}_{p+s} = \bar{K}_p + \bar{K}_s,$$

or for three colinear waves $n_{p+s}(\omega_p+\omega_s)=n_p\omega_p+n_s\omega_s$, where $n_{p+s}$, $n_p$, and $n_s$ are the indices of refraction, taken into account the polarization directions, of the sum, pump, and signal waves respectively.

Under some circumstances index matching cannot be achieved, thereby requiring that the material 13 be longitudinally very thin with respect to the wavelength of the radiation being mixed.

Besides generating the sum frequency $\omega_s+\omega_p$, the output of a nonlinear material can also contain frequencies $\omega_p$ and $\omega_s$, the difference frequency $\omega_p-\omega_s$, and higher harmonics of $\omega_p$ and $\omega_s$ due to self-mixing a process which can cause unwanted outputs and depletions of the pump beam $\omega_p$.

However, in accordance with the principles of the present invention, depletion of the laser beam $\omega_p$ occurs only during interactions with the signal beam $\omega_s$ and not with interactions with itself, i.e., higher harmonics of the pump will not be generated as a result of self-mixing. Therefore, depletion of the laser beam $\omega_p$ will be a minimum and will take place only when the signal beam $\omega_s$ is present.

This feature is provided in the present invention by choosing for mixer 13 a nonlinear optical crystal having a symmetry such that the components of the nonlinear polarizability tensor which couple parallel components along one of the crystal axes all vanish. The crystal is then cut such that this axis lies in the plane of the major flat surface of the crystal and is oriented parallel to the electric field of the pump beam $\omega_p$, which is linearly polarized by polarizer 16.

The electric polarization vector produced by the nonlinear mixing of input electric fields is given by the tensor equation:

$$P_i = d_{ijk} E_j E_k \qquad i,j,k = x, y, z$$

where the $d_{ijk}$ are the nonlinear susceptibilities which forms the nonlinear polarizability tensor. Theoretically, a material is nonlinear, if any one or more of the $d_{ijk}$ do not vanish. The symmetry of the crystal lattice determines which ones of the $d_{ijk}$ do vanish. All noncentrosymmetric crystals are capable of nonlinear mixing and all crystals in the same class have the same $d_{ijk}$'s equal to zero. However, the absolute magnitude of the $d_{ijk}$ which do not vanish are generally different and must be measured for each crystal.

For example, the following expressions are true for all crystals in the class $\bar{4}2m$:

$$P_x = d_{xyz} E_y E_z$$
$$P_y = d_{xyz} E_x E_z$$
$$P_z = d_{xxy} E_x E_y$$

In the above expressions the subscripts $x$, $y$ and $z$ represent the natural crystallographic axes. The KDP crystal is an example of a crystal in this class. Therefore, the polarization vector $\bar{P}$ for all crystals in the class $\bar{4}2m$ is defined by the same general equations as that for KDP. It can, therefore, be seen that in order for the crystal to radiate along a particular axis, one must first have a pair of mutually orthogonal electric field components, and the crystal must be cut such that one of the major flat surfaces thereof is perpendicular to that axis. For example, if there are two input electric fields having components $E_x$ and $E_y$, then there will be a polarization $P_z$ and the crystal will radiate along an axis which is perpendicular to a major flat surface of the crystal (it is assumed that the flat surface is not perpendicular to the $x$-axis).

Figure 2:
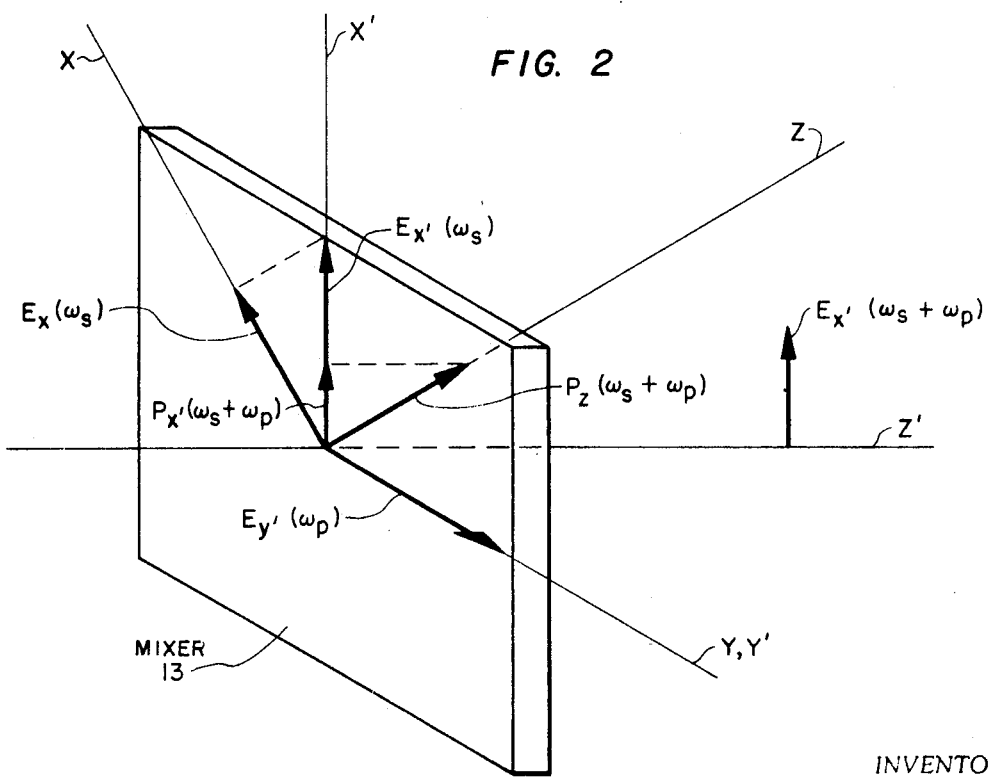
FIG. 2 is a vector diagram helpful in describing the invention.

If the nonlinear material 13 is cut and oriented as shown in FIG. 2 and belongs to the class of crystals $\bar{4}2m$, then depletion of the pump beam $\omega_p$ will take place only when the signal beam $\omega_s$ is present. In FIG. 2, the orthogonal set of axis $x$, $y$ and $z$ represent the normal crystallographic axes. An $xz$-cut $\bar{4}2m$ crystal 13 is oriented with respect to the pump and signal beams $\omega_p$ and $\omega_s$ such that the major faces of crystal 13 is perpendicular to the $Z'$ axis, which is the direction of propagation of the pump and signal beams $\omega_p$ and $\omega_s$. Polarizer 16 has insured that the pump and signal beams $\omega_p$, $\omega_s$, are linearly polarized such that the corresponding electric fields $E(\omega_p)$ and $E(\omega_s)$ lie along axes which are mutually orthogonal. Also, the crystal 13 is oriented such that the $y$ and $y'$ axis are colinear and the electric field $E(\omega_p)$ is polarized along the $y'$ or $y$ axis. As a result, the electric vector $E(\omega_s)$, which is polarized along the $x'$ axis and therefore has a component along the $x$-axis, produces a polarization component $P_z(\omega_s+\omega_p)$ in accordance with the last of the above expressions, i.e., $P_z$ $= d_{xxy}E_xE_y$. Further, the polarization vector $P_x(\omega_s+\omega_p)$ will have a component $P_{x'}(\omega_s+\omega_p)$ along the $x'$-axis which is parallel to the major face of the crystal 13. Finally, there will then be radiation of a frequency $\omega_p + \omega_s$, the electric field of which will be polarized along the direction of the the polarization vector $P_{x'}$.

The nonlinear susceptibilities which give rise to self-mixing of a field oriented along one of the axis $x$, $y$ or $z$ are all zero in this case. Therefore, if there is no signal beam $\omega_s$, then there will be no nonlinear mixing and the pump beam $\omega_p$ will simply pass through the crystal 13 without any depletion.

Another class of suitable crystals, class $\bar{4}3m$, has the following relationship between the polarization and the electric fields:

$$P_x = d_{xyz}E_yE_z$$
$$P_y = d_{yzx}E_xE_z$$
$$P_z = d_{zxy}E_xE_y$$

An example of a crystal in this class is GaP. It is to be noted, that upconversion can take place here without self-depletion of the pump beam $\omega_p$, if the crystal is given a $yz$-cut, the pump beam $\omega_p$ is linearly polarized with the electric vector $E(\omega_p)$ polarized parallel to the $x$-axis, and the signal beam $\omega_s$ polarized parallel to the $yz$-plane. Other cuts and orientations are also possible.

An example of a crystal class not suitable for practicing this invention is the class $3m$. Lithium niobate is a typical crystal in this class and is characterized by the following expressions.

$$P_x = d_{xzx}E_xE_z$$
$$P_y = d_{yyz}E_yE_z$$
$$P_z = d_{zxx}E_x^2 + d_{zyy}E_y^2 + d_{zzz}E_z^2.$$

Although the pump and signal beams $\omega_p$ and $\omega_s$ can mix to produce a sum beam $\omega_p + \omega_s$ as a result of the first two equations, there will also be a contribution to the $P_z$ component from the $E_x^2$ or $E_y^2$ components as well as the $E_z^2$ components which give rise to self mixing. This will produce a radiation field at the second harmonic of the pump beam $\omega_p$, thereby depleting the pump beam $\omega_p$ even when the signal beam $\omega_s$ is not present.

It should be understood, of course, that the foregoing disclosure relates to a preferred embodiment of the invention and that numerous modifications and alterations may be made therein without departing from the spirit and the scope of the invention as set forth in the appended claims.

What is claimed is:

1. An optical frequency converter comprising pump means for generating a pump signal; polarizing means for linearly polarizing said pump signal parallel to a first axis; input means for linearly polarizing an input signal along a second axis perpendicular to said first axis; a nonlinear mixing means mounted in the path of said pump signal and said input signal and including a nonlinear optical crystal having a polarizability tensor of nonlinear susceptibility components with those nonlinear components associated with the self mixing of a field polarized along said first axis substantially equal to zero and having a substantial nonlinear component for mixing a signal polarized along said first axis with a signal polarized along said second axis.

2. The device according to claim 1 and wherein said pump means includes a laser.

3. The device according to claim 2 and wherein said nonlinear optical crystal is located in the resonant cavity of said laser.

4. An optical frequency converter comprising a laser means having a resonant cavity means for generating a linearly polarized pump signal; said cavity means including a signal input means for linearly polarizing an input signal in a direction perpendicular to said pump signal; a nonlinear mixing means mounted in said cavity for mixing said pump signal only with said input signal to produce a mixed signal; and a cavity output means for passing said mixed signal out of said cavity.

5. The device according to claim 4 and wherein said mixed signal has a frequency which is the sum of said pump signal frequency and said input signal frequency.

6. The device according to claim 5 and wherein said nonlinear mixing means includes a nonlinear optical crystal having a polarizability tensor of nonlinear susceptibility components; and said tensor having those components associated with the self-mixing of field components polarized in the direction of said pump signal substantially equal to zero.

* * * * *